Dec. 3, 1935.　　　　　　G. MORRELL　　　　　2,022,895
METHOD OF MAKING CASEIN BUTTONS
Filed March 28, 1935　　　3 Sheets-Sheet 2
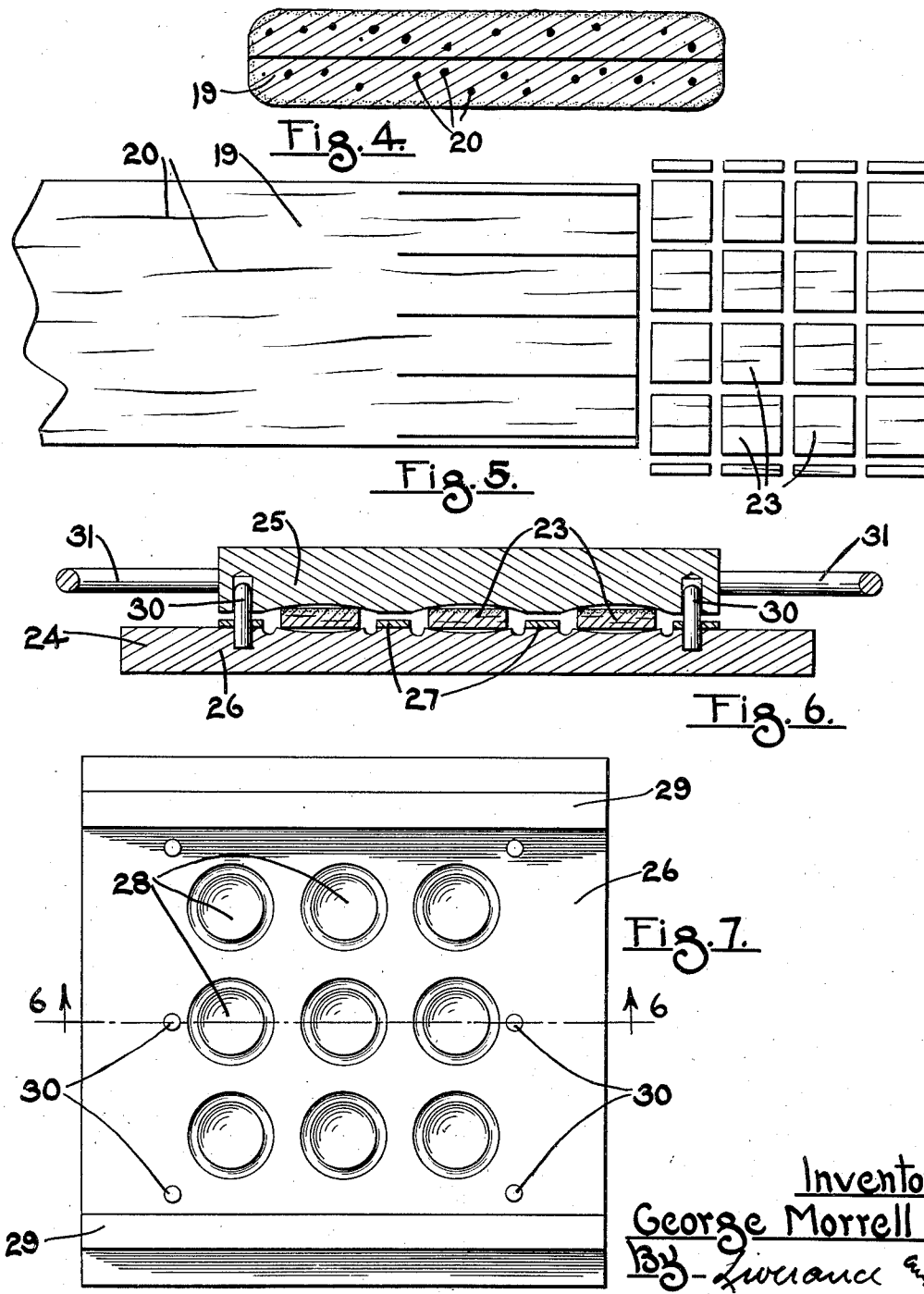

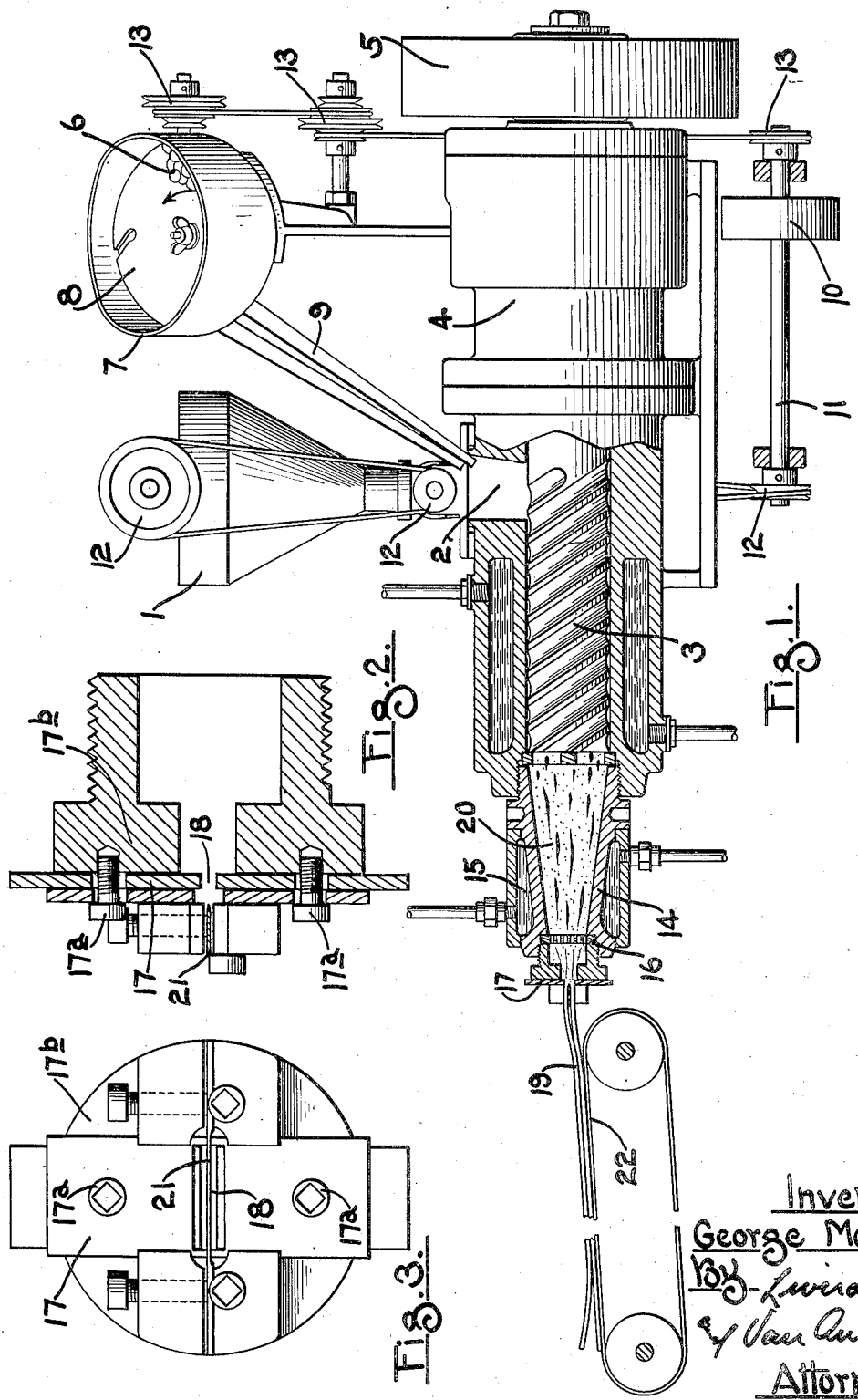

Dec. 3, 1935.  G. MORRELL  2,022,895
METHOD OF MAKING CASEIN BUTTONS
Filed March 28, 1935     3 Sheets-Sheet 3

Inventor
George Morrell
By Lawrence
and Van Antwerp
Attorneys

Patented Dec. 3, 1935

2,022,895

UNITED STATES PATENT OFFICE 2,022,895

METHOD OF MAKING CASEIN BUTTONS

George Morrell, Muskegon, Mich., assignor to George Morrell Corporation, Muskegon Heights, Mich., a corporation of Michigan Application March 28, 1935, Serial No. 13,401

2 Claims. (Cl. 18—47.5)

This invention relates to the method of making casein buttons and other casein articles including the making of mottled colored buttons, by a molding process.

In this process commercial Rennet casein in powdered or granulated form is converted into a mottled ribbon by a combination of compression and extrusion, particles of one color casein being intermingled with the main body of a different color during the compressing and extruding process whereby irregular elongated colored portions are distributed throughout the extruded ribbon. For the proper effect the buttons formed from the extruded material must be made flatwise thereof so that the colored portions will extend flatwise through the button. In other words, it is not possible to get the desired color effect or pattern by forming the button from disks cut transversely from the extruded strip in which case the colored portions would appear in cross section and in the form of relatively small dots in the finished button rather than as elongated colored streaks.

There are obstacles in the way of making buttons in the aforedescribed manner as for example the dull colored unattractive skin which forms on the surface of the extruded strip which is the result of the extruding process and is caused by the heat and friction developed during extrusion. This skin cannot be permitted to appear upon the surface of the finished button. Buttons must be sold very cheaply and it is therefore necessary to follow a process of manufacturing them which will be most expeditious and will reduce the manufacturing cost.

By this invention the interior of the extruded ribbon is exposed. The material is cut into blanks of correct contents to form buttons. The blanks are placed in a die and subjected to heat and pressure and molded into the desired finished shape.

This invention provides a process by which buttons of attractive appearance and design may be made from casein most efficiently and at a low manufacturing cost and overcomes the various obstacles which have arisen in the past methods of making buttons of this character. The invention is hereinafter more fully described and particularly pointed out in the claims, reference being had to the accompanying drawings, in which Fig. 1 is an elevation, partly in section, of the converting and extruding machine.

Fig. 2 is an enlarged longitudinal section of the extruding die.

Fig. 3 is an end elevation of the extruding die.

Fig. 4 is an enlarged cross section of the extruded casein ribbon.

Fig. 5 is a plan view of the casein ribbon with a portion of it cut into sections from which buttons are to be molded.

Fig. 6 is a sectional elevation of a die used for molding buttons taken on the line 6—6 of Fig. 7, and showing the blanks of casein in place ready to be molded.

Fig. 7 is a plan view of the lower part of the die.

Like reference numbers apply to like parts in the drawings.

Figure 8:
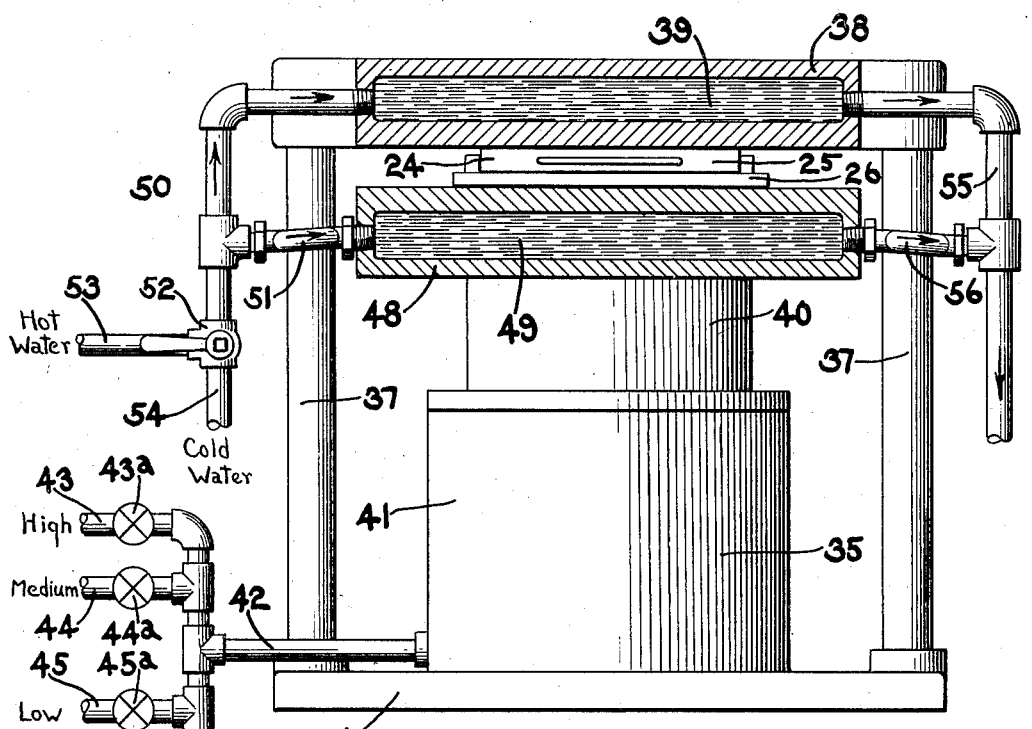
Fig. 8 is a diagrammatic elevation, partly in section, of the press in which the die is heated, compressed and cooled.
Figure 9:
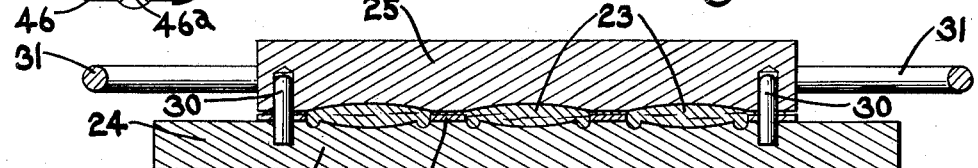
Fig. 9 is a cross section of the die corresponding to Fig. 6 but showing the die compressed and the buttons molded.
Figure 10:
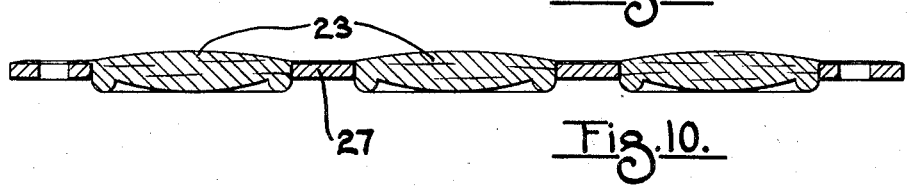
Fig. 10 is an enlarged sectional detail of the buttons and center plate of the die removed from the die.
Figure 11:
Fig. 11 is a cross section of a completed button.

The casein material from which the buttons are to be made is commercially known as Rennet casein. It is ground and mixed with the conventional chemicals and coloring material as desired and its moisture content is kept within very close limits. The casein of the body color is placed in the hopper 1 of the extruding machine in granulated form and from this hopper it is fed in controlled quantities by suitable means into the entrance 2 of the feed screw 3 which is rotated and moves the material forward creating a high pressure. The screw 3 is rotated by suitable means such as conventional gearing within the casing 4 driven by a belt passing over the pulley 5.

The color strips in the body of the material are provided particles of casein of contrasting color which are periodically deposited in the entrance 2 to combine with the body material fed from the hopper 1. These color particles may be in the form of disks of compressed casein indicated by 6 located in the hopper 7 from which they are fed one by one by a suitable automatic feeding device 8 and deposited in a chute 9 from where they pass into the entrance 2. A pulley 10 is shown by which a shaft 11 is rotated and various belts and pulleys 12 and 13 respectively serve to drive the feeding device of the hopper 1 and the feeding device of the hopper 7. These mechanisms specifically form no part of the present invention being the subject of my copending patent application Serial No. 25,950, filed June 10, 1935 and are therefore not more thoroughly described herein.

The casein material is fed by the screw 3 into a compression chamber 14 and the feed screw 3 creates great pressure on the material and forces it from the compression chamber 14 through a perforated plate 16 and from there into and through the extruding die 17. The die aperture 18 to perform the process of the present invention is of narrow elongated shape so that the material extruded therefrom is of flat elongated ribbon form 19.

In passing through the extruding machine the color particles which have been deposited into the main mass of body material have become elongated and distributed through the mass so that in the extruded ribbon they appear as irregular elongated strips of contrasting color 20 extending lengthwise of the ribbon.

During the extruding process a dull unattractive appearing skin is formed on the surface of the ribbon, this skin obscuring the true color of the material and being of a nature to spoil the appearance of the finished article if it were to be left upon a surface which would ultimately be a finished surface of the article. However, the interior of the ribbon beneath the skin maintains the true desired beautiful color. Adjacent the outside of the extruding die 17, a splitting blade 21 is located in a position in which it will split the ribbon as it passes from the die transversely between its two flat sides. This splitting operation therefore in effect makes two flat ribbons of the original extrusion each of half the thickness of the original ribbon and each having a surface material which was interior of the body during the extrusion and therefore not defaced by the outer skin, the splitting operation not acting to mar the color of the material.

The extrusion opening 18 should be adjustable relative to the blade 21 for the reason that because of peculiarities of the extrusion process and machinery the ribbon extruded from the die may tend to have a thicker body on one side of the blade 21 than on the other. To overcome this tendency the die 17 having the opening 18 is mounted for sliding movement relative to the blade 21 and clamping screws 17a bearing against the body 17b permit the die 17 to be moved relative to the blade as conditions demand.

The ribbon which has thus been extruded and split is deposited upon a slowly traveling belt 22 from which lengths are cut and removed from time to time as the operation continues.

These sections of the extruded ribbon which has been split are then cut into blanks each of which contains the proper volume of material to form a finished individual button or other article. The size of the blank would of course depend upon the size of the article to be formed. The blanks may be cut from the ribbon by any suitable means and may be of any desired shape but for greatest economy the blanks are preferably square or rectangular and should be thicker than the finished article. Fig. 5 illustrates a method of cutting the blanks 23 from the ribbon which consist of first splitting the ribbon lengthwise into several strips and removing as waste the respective edges upon which the undesirable skin exists. These strips are then cut into the square blanks 23. Each of these blanks has the undesirable skin on one of its flat surfaces but all of its other surfaces display the material which was beneath the skin in the original extrusion and therefore they are of the bright true color desired.

The blanks 23 are then placed in the button forming die 24. The die may be made to form any desired number of buttons but it is more economical to have the die of a sufficient size to form a considerable plurality, the individual button forming die cavities being duplicated in the die structure.

The die 24 is of conventional form having upper and lower separable members 25 and 26 and in the structure shown a middle center plate 27 is used, this also being separable. The die cavities are formed in these die members so that when they are assembled and pressed together there will be a plurality of cavities 28 each the exact size and shape of the desired button. The lower die member 26 is provided with guide blocks 29 and dowels 30 to maintain the die members 25 and 27 in proper relative positions and handle members 31 are provided on the upper die members 25 for convenience in handling.

The blanks 23 are placed in the die cavities with the surface upon which the dull skin appears next to the die portion which will form the back of the button so that in the completed button the undesirable color will be at the back where it will be unobjectionable. When the blanks are placed between the die members they will be thicker than the completed buttons and will therefore hold the die members separated as illustrated in Fig. 6.

The next step in the operation is performed in a heat treating press 35 which acts to heat the casein material sufficiently to make it plastic and also presses the die members together to form the buttons. The press 35 comprises a base 36 having uprights 37 upon the lower end of which is mounted a pressure head 38 having a water cavity 39. A pressure exerting mechanism is mounted on the base and consists of a hydraulic operated piston 40 in a cylinder 41. The piston 40 moves vertically and fluid such as water or oil under pressure is introduced into the cylinder 41 through the pipe 42.

It is desirable to have various pressures applied to the piston 40 and to have suitable sources of different fluid pressures connected with the pipe 42 although it is to be understood that a single source of variable pressure may be utilized if desired. In the drawings the pipe 42 communicates with each of the pipes 43, 44, 45 and 46, each of these pipes having respective valves 43a, 44a, 45a and 46a to control flow of fluid through them.

The pipe 43 communicates with a source of low pressure of the order of 40 pounds per sq. in., the pipe 44 communicates with a source of intermediate pressure of the order of 700 pounds per sq. in. and the pipe 45 communicates with a source of high pressure of the order of 2000 pounds per sq. in. or over. The pipe 46 is a return or relief pipe through which fluid flows from the cylinder 41 to permit the piston 40 to lower. By manipulation of the valves different pressures may be exerted upon the piston 41 or the pressure may be relieved and the piston permitted to fall.

A pressure plate 48 having a water cavity 49 is located upon the piston 40 and is moved vertically by the piston and the die 24 is placed between the pressure plate 48 and the pressure head 38 where it is subjected to both heat and pressure changes. A source of relatively cold water of the order of 60° F. and another source of hot water of approximately 180° F. are alternately in communication with the water cavities 39 and 49. A pipe 50 leads to the cavity 39 and a branch flexible hose 51 leads to the cavity 49 in the movable pressure plate 48 permitting vertical movement of this plate without disturbing the water communication. Both of the conduits 50 and 51 communicate with a valve 52 with which the hot water pipe 53 and the cold water pipe 54 respectively communicate. By means of the valve 52 either the hot water or the cold water may be directed to flow into the cavities 39 and 49. An outlet pipe 55 communicates with the cavity 39 and a branch flexible hose 56 communicates with the cavity 49 providing an outlet for the water so that it may circulate through the cavities 39 and 49 effecting heat changes of the pressure head 38 and the pressure plate 48.

The die 24 with the blanks 23 therein in the condition illustrated in Fig. 6 is placed between the pressure head 38 and the pressure plate 48 when they are separated and the valve 43a is opened to permit low pressure fluid to enter the cylinder 41 and raise the piston 40 which will lightly press the die and cause firm contact between it and the blanks. This pressure must not be great enough to distort or fracture the material of the blanks when cold. The valve 52 is adjusted to admit hot water to flow through the cavities 39 and 49 to heat the die and its contents and during this heating operation the low pressure may be maintained under the piston 40 with the valve 43a open or this valve may be closed so that no further pressure will be exerted but its parts will simply be held in contacting relationship.

It has been determined that the heating medium should be at a temperature of approximately 180° F. and cannot vary greatly above or below that heat. When the casein blanks have been thoroughly heated so that they are plastic the pressure on the piston 40 is increased by opening the valve 44a introducing the fluid under intermediate pressure. This pressure is sufficient to flow the now plastic casein in the die cavity into approximately its finished shape but inasmuch as this pressure is not extreme the flowing or distortion of the plastic casein has not been violent and has not disrupted its texture.

After the intermediate pressure has been applied and the casein has assumed its approximately finished form in the mold the valve 45a is opened to admit the high pressure to the piston 40 which forcibly squeezes the die members toward each other and forces excess casein material between the die members where it remains in the form of a thin fin or film. Inasmuch as it is impracticable to provide exactly the proper volume of casein in each of the blanks to fill the mold cavity it is necessary to have a slight excess to insure the completely filled cavities which excess is removed as above described.

The casein material must be maintained in heated form during all of the pressing operations. This may be done by continuing the flow of hot fluid through the pressure head and pressure plate during the pressing operations or if it has been ascertained that the die once heated will retain its heat sufficiently to maintain the casein in plastic form during the pressing operations the flow of hot fluid may be stopped after the die and its contents have become heated. After the pressing operations are completed the valve 52 is adjusted to admit cold water to the cavities of the pressure head and pressure plate to cool the die and its contents and this is preferably done while pressure is being maintained upon the die. After the die and its contents have been cooled sufficiently to harden the casein the pressure conduits are closed and the valve 46a is opened to vent the cylinder 41 and permit the piston 40 and the pressure plate 48 to lower so that the die may be removed.

The foregoing operation has been described as taking place in one press wherein the die is subjected to both heat and pressure changes. It is conceived, and under some conditions it may be more practicable, to perform these operations in different presses. For example, the die may be subjected to different pressures in different presses each of which exerts a single pressure different than the others. It is also feasible to heat and cool the die and its contents by other means than the circulation of heating and cooling mediums through the pressure head and pressure plate as illustrated. For example, the die members may be clamped into engagement with the contents of the die and heated by any suitable means apart from the press and then inserted in the press after having been heated and likewise the die after having been compressed may be held in this position and removed from the press for cooling. These details of mechanism for performing the operation and specific details of the operation itself may be varied without departing from the spirit of the invention.

After removal the die parts are separated and the buttons removed. These buttons thus removed from the die are of substantially the proper form for use although it is necessary to treat them to some finishing operations such as removing fins of material in the edges, boring thread-holes and polishing, which operations are performed in suitable and conventional manner. It is conceived that the molds may be made so as to form the thread-holes in the buttons if desired. It is also desired to subject the buttons to the customary formaldehyde treatment which considerably hardens the casein material and it is to be understood that all of the aforedescribed process occurs before the formaldehyde treatment.

By use of this invention high quality buttons may be made much more cheaply than has been possible by former methods and machinery and it is to be understood that although the foregoing description has named buttons as the articles to be made, the same process and machinery can be used to make other articles of casein.

The invention is defined in the appended claims and is to be considered comprehensive of all forms of structure coming within their scope.

I claim:

1. The process of making articles from casein which comprises, converting powdered casein into a solidified mass by pressure and extrusion, removing the skin of said extrusion thereby exposing the interior, cutting blanks from said extrusion, each of said blanks having a surface formed by said exposed interior, placing said blanks in a compressible die, and subjecting said die to heat and pressure changes thereby molding said casein material into the desired shape with said exposed interior forming a finished surface of the article.

2. The process of making casein articles which consists of converting powdered casein interspersed with particles of compressed casein of contrasting color into a solidified elongated mass by pressure and extrusion, splitting said extrusion longitudinally thereby exposing its interior, cutting blanks from said split extrusion, each of which has a surface composed of said interior extrusion and pressing said blanks into the desired form in which said interior exposure constitutes a finished surface of the article.

GEORGE MORRELL.